May 6, 1969  R. S. PETERSEN  3,442,278
TEMPERATURE SENSITIVE SWITCH
Filed Feb. 28, 1966  Sheet 1 of 2

INVENTOR
RUDOLPH S. PETERSEN

BY

ATTORNEY

INVENTOR
RUDOLPH S. PETERSEN

ATTORNEY

United States Patent Office 3,442,278
Patented May 6, 1969

3,442,278
TEMPERATURE SENSITIVE SWITCH
Rudolph S. Petersen, Brookline, N.H., assignor to Sanders Associates, Inc., Nashua, N.H., a corporation of Delaware
Filed Feb. 28, 1966, Ser. No. 530,726
Int. Cl. F15c 1/14
U.S. Cl. 137—81.5                    10 Claims

ABSTRACT OF THE DISCLOSURE

A device without moving parts for switching the flow of fluid from one to another channel in response to a change in temperature of fluid flowing in a preselected portion of the system, either through the switch itself, or elsewhere.

---

This invention relates to fluid control valves and more particularly to a device for switching fluid flow between two or more paths depending upon the temperature of the same or another fluid.

Heretofore, a variety of mechanical devices have been employed for controlling the flow of a fluid depending upon the temperature of the fluid. For example, the flow of cooling fluid to a load has been controlled by a mechanical valve including a body of selected material having a high coefficient of expansion in the path of the fluid which expands or contracts in response to the temperature of the fluid and in doing so rapidly loads or unloads a spring which positions a poppet valve against a seat. Thus, the fluid flow through the poppet valve is throttled in accordance with the fluid temperature. Such devices obviously offer considerable resistance to the fluid flow at all times even when the poppet valve is open. In addition, the moving parts are subject to wear and must be machined to close tolerances to provide satisfactory operation.

It is one object of the present invention to provide means having no moving mechanical parts for controlling the flow of a fluid depending upon the temperature of the same fluid or the temperature of another fluid.

It is another object of the present invention to provide means for controlling the flow of a fluid depending upon the temperature of the fluid, the dimensional tolerances between parts thereof being relatively low.

It is another object of the present invention to provide means for switching the flow of a fluid between a plurality of different paths depending upon the temperature of the fluid, all power for such switching being derived from the fluid itself.

It is another object of the present invention to provide bi-stable switching means for switching the flow of a fluid to one or the other of two different paths depending upon the temperature of the fluid.

It is another object of the present invention to provide means for controlling the flow of the fluid depending upon the viscosity of the fluid.

The present invention includes some of the operating principles of the fluid amplifier to control the flow of, for example, a cooling fluid to a load depending upon the temperature of the cooling fluid. Two fundamental mechanisms are involved in the operation of a fluid amplifier. In accordance with one mechanism, momentum is transferred to a main fluid stream by one or more control fluid streams or jets directed transverse to the main stream. The other mechanism is the wall effect which is also controlled by one or more control jets generally directed transverse to the main stream. The wall effect refers to the tendency of the main fluid stream to attach itself to one of the walls of a conduit or interaction space into which it is injected. As the injected main stream of fluid enters the interaction space, it entrains fluid from the surrounding medium and this entrained fluid must be drawn into the main stream from afar. The flow of entrained fluid into the main stream along the side of the stream which attaches to the wall is impeded and a low pressure pocket or bubble is formed upstream of the point of attachment. This low pressure bubble is entrapped and so the main fluid stream tends to remain attached to the wall. Both the wall effect and momentum transfer are siginfiicant in the operation of most fluid amplifiers.

The present invention contemplates the use of two controlled jets preferably directed transverse to the main fluid stream, one on each side thereof, the flow from each tending to cause the main stream to attach to the wall of the interaction space opposite the strongest control jet. The control jet or jets are preferably derived from a common source of fluid which may be the same as the main fluid stream and are directed against the main fluid stream from control channels or conduits at least one of which is designed so that the control jet issuing therefrom varies substantially as the viscosity of the control jet fluid. Since fluid viscosity varies radically with temperature, the position of the main fluid stream in the interaction space will vary depending upon the control fluid temperature.

In accordance with a preferred embodiment of the invention, two oppositely directed controlled jets are employed. The channel for one is designed to deliver a control jet which is substantially independent of viscosity or temperature changes of the control fluid while the channel for the other is designed to deliver a control jet which is substantially affected by viscosity changes of the control fluid. More particularly, the first mentioned channel delivers a control jet against the main fluid stream through a sharp orifice while the other delivers a control jet through a substantial length of relatively small dimension pipe-like conduit through which fluid flow is substantially affected by fluid viscosity. As a result, if the fluid is a liquid for which viscosity decreases as temperature increases, the first-mentioned control jet will dominate control of the main stream when the fluid is below a given temperature and the other control jet will dominate control of the main stream when the fluid temperature is above the given temperature. The converse is the case when the fluid is a gas, because for most gases, viscosity increases as temperature increases. However, in either event, whether the fluid is a liquid or a gas, the main fluid stream will switch from one wall to the opposite wall when the fluid temperature rises or drops through a given predetermined temperature and so the main fluid stream can be switched between loads or utilizing systems depending upon the temperature of the control fluid.

Other features and objects of the present invention will be apparent from the following specific description taken in conjunction with the figures in which.

Figure 1:
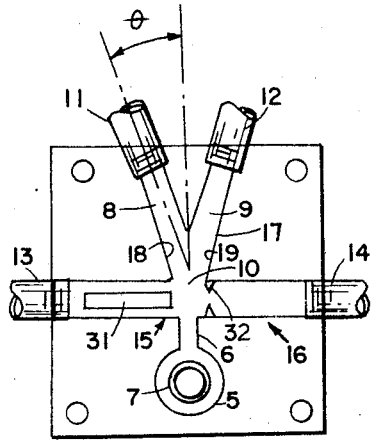
FIGURES 1 and 2 are plan and side views of a fluid switch whereby a main stream of fluid is controlled in accordance with the temperature of another fluid.
Figure 2:
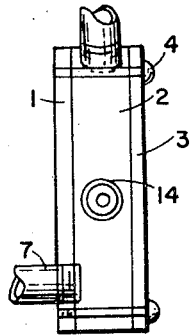

Referring first to FIGURES 1 and 2, the fluid switch is formed of, for example, three laminae or plates 1, 2 and 3 which are tightly sealed together by means such as the screws 4 or a suitable cement. The three plates may be metal, plastic, or any other suitable material which can be sealed to provide the conduits or channels for the fluids employed. For purposes of illustration, the plates 1, 2 and 3 are shown as a clear plastic or glass in order to reveal the significant parts thereof and channels for conducting the fluid.

The plate 2 is grooved or cut to define spaces, and channels the fluid upon assembly with the other plates 1 and 3. These spaces include a main fluid inlet chamber 5 which delivers a main stream of fluid at substantial velocity through channel 6. Fluid is delivered to the chamber 5 via a tube 7, which threads plate 1, and which connects to a source of pressurized fluid or to a pump which supplies the main fluid at suitable operating pressure. The main stream of fluid issuing from the channel 6 into the interaction space 10 flows either to channel 8 or channel 9, which connect therewith, forming a Y-shaped configuration. Channels 8 and 9 deliver the main fluid to tubes 11 and 12, respectively, which connect to utilization devices, or loads, or to by-pass systems, or to whatever devices the fluid is being delivered to. In operation, the switch is preferably controlled so that the main stream of fluid issuing from channel 6 is delivered to channel 8 or channel 9, depending upon the viscosity of a control fluid simultaneously delivered to the control inlet tubes 13 and 14 which connect to pipe and orifice control channels 15 and 16, respectively, on each side of the main channel 6. The control fluid delivered to the controlled channels 15 and 16 is preferably from a common source and the delivery systems which connect the tubes 13 and 14 to this source are preferably similar so that control fluid at the same pressure and temperature is delivered to the entrance of each of the control channels 15 and 16.

The purpose of the control channels 15 and 16 is to deliver jets of control fluid to the interaction space 10 on each side of the main stream of fluid issuing from channel 6 such that these jets act upon the main stream and cause the main stream to flow out of channel 8 or channel 9 depending upon the viscosity (temperature) of the control fluid. There are two effects of the control fluid jets on the main fluid stream. These are fluid momentum transfer and the wall effect and both of these effects play a part in determining which of the channels, 8 or 9, the main stream of fluid flows through.

Consider the mass flow rate and momentum M of the control jets. Assume that the density $\rho$ of fluid in each of the control jets is the same but velocity V and cross section area A are different. Thus, the momentum of the jet from channel 15 is $M_{15} = \rho V^2_{15} A_{15}$. Likewise, the momentum of the opposing controlled jet from channel 16 is $M_{16} = \rho V^2_{16} A_{16}$. Since $M_{15}$ and $M_{16}$ are directed oppositely, the difference momentum $\Delta M$ added to the momentum of the main fluid stream $M_m$ gives the net momentum of the three-fluid stream. The angular deflection $\theta$ of the main fluid stream resulting from the added momentum of the control jets is $\theta = \tan^{-1} \Delta M / M_m$. The switch is designed in consideration of operating conditions such that switching can be accomplished from channel 8 to channel 9 or vice versa when $\theta$ is half the angle of the wedge portion 17 of plate 2 which defines the channels 8 and 9.

The wall effect is also of considerable significance and stems from the phenomenon that a fluid jet flowing in close proximity parallel to a wall tends to attach itself to the wall. The reason for this is that as the jet moves it entrains more fluid from the surrounding medium and this entrained fluid must be made up from fluid from afar. Since the wall is close to one side of the jet stream, the flow of replacement fluid to this side of the jet stream is impeded and results in a slightly lower pressure on the side of the jet closest to the wall. As a consequence, the slightly greater pressure on the opposite side of the jet forces the jet to cling to the wall, making it even more difficult for replacement fluid to flow into a low pressure pocket region created just upstream of the point of attachment of the fluid stream to the wall. Thus, in the switch shown in FIGURES 1 and 2 once the main stream of fluid issuing from channel 6 into the interaction space 10 attaches to wall 18 or wall 19 which lead to channels 8 and 9, respectively, it will tend to remain attached to the wall until the momentum of the control jet issuing from the same wall is sufficiently greater than the momentum of the opposite jet to cause the main stream to switch over and cling to the opposite wall.

The construction of the control channels 15 and 16 is such that the momentum and the mass flow of the control jet issuing from at least one of these channels is considerably affected by the viscosity of the control fluid. For example, if control channel 15 is designed so that the mass flow rate and the momentum of the control fluid issuing therefrom varies substantially with changes in the viscosity of the control fluid while at the same time the control jet issuing from channel 16 is not varied or varies in a much different manner or varies to a substantially lesser degree, then viscosity of the control fluid will determine which path, (through channel 8 or through channel 9) the main stream of fluid is going to take.

One type of fluid conduit through which fluid velocity is very sensitive to fluid viscosity is the simple pipe and the effect of viscosity on velocity (other parameters being equal) becomes greater as the diameter of the pipe is made smaller or more particularly the ratio of wetted perimeter length to cross section area is made larger.

In the switching structures shown in FIGURES 1 and 2 control channel 15 is preferably designed so as to have a substantially greater ratio of wetted perimeter length to cross section area than control channel 16 so that the velocity and, thus, the momentum and mass flow rate of the control jet issuing from channel 15 are substantially affected by changes in control fluid viscosity, whereas these parameters of the control jet issuing from channel 16 are not. However, in order to insure that at some point during operation the mass flow rate and momentums of the two control jets are equal or at least have the same effect or equal effects on the main stream of fluid, it is necessary that there be a restriction of some sort in control channel 16 and it is preferable that the restriction not cause any substantial changes in momentum or in mass flow rate of the control jet issuing therefrom due to viscosity changes of the control fluid. The sharp edge orifice is a suitable restriction for this purpose as can be illustrated by the curves in FIGURE 5 which are plots of mass flow rate versus temperature of a typical liquid fluid for which viscosity decreases as temperature increases.

Figure 5:
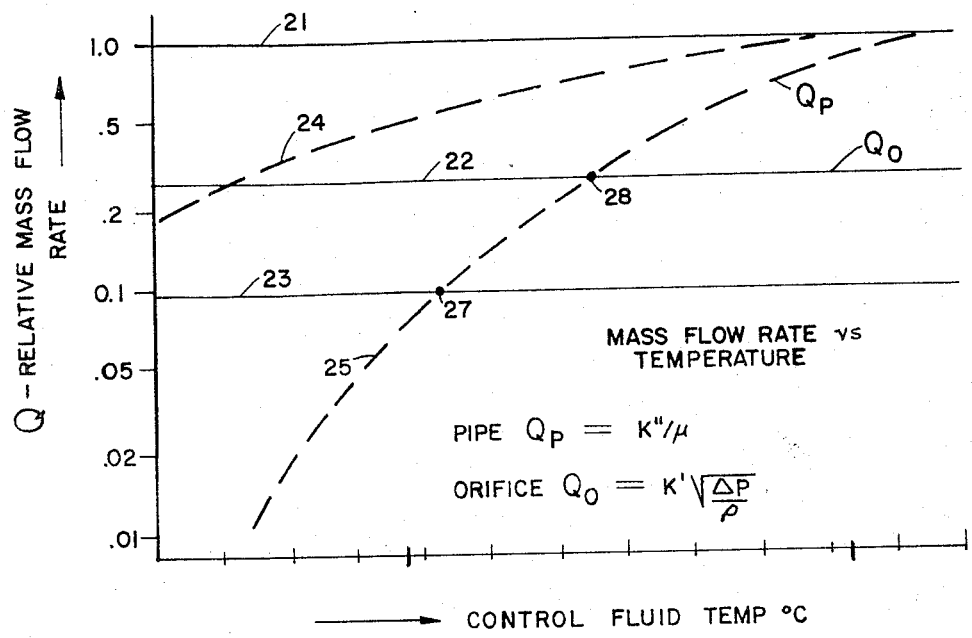
FIGURE 5 is a plot of fluid mass flow rate versus temperature for a typical liquid fluid showing the character of orifice and pipe flow to illustrate the different effects of viscosity thereon.

As shown in FIGURE 5, the solid line curves 21, 22 and 23 represent liquid flow rate versus temperature for flow through a sharp edge orifice at three different liquid delivery pressures. For example, incompressible flow rate Q through a sharp edge orifice may be given by the expression $Q_0 = K'(\Delta P/\rho)^{1/2}$.

The density $\rho$ of a liquid is substantially independent of temperature and the pressure drop $\Delta P$ through the orifice for each of the curves 21, 22 and 23 is constant. Therefore, as shown by these curves, the mass flow rate through the sharp edge orifice at each delivery pressure remains substantially constant even though the fluid temperature increases. Such is not the case, however, for flow through a pipe. Flow of an incompressible fluid at constant delivery pressure through a pipe can be approximated by the relationship $Q_p = K''/\mu$ where $\mu$ is the dynamic viscosity of the fluid and $K''$ is substantially a constant since it is a function of pressure differential, fluid density, pipe cross section area and pipe length. If the fluid selected exhibits substantial viscosity change with temperature change, then $Q_p$ will increase sharply with the decreasing viscosity accompanying the increasing liquid temperature. The mass flow rate of the jet issuing from the pipe at different delivery pressures is represented by the different broken line curves such as 24 and 25.

It is quite possible to design a pipe control channel and an orifice control channel so that any operating curve such as 25 for pipe channel may accompany operation of the orifice channel along a particular operating curve such as 23, and so the temperature at which the pipe and orifice operating curves cross may be predetermined. Two such crossover points are illustrated in FIGURE 5. These are point 27 where curve 23 and 25 cross and point 28 where curve 22 and 25 cross. It should be noted that at each of these crossover points a plus or minus ten percent change in the pipe mass flow parameter occurs for a five to ten degree temperature change. This produces a sharp switch in the direction in the control force acting upon the main fluid stream causing it to switch from one of the channels 8 or 9 to the other when temperature increases or decreases through the crossover point. For example, assume that the pipe control channel design and the control fluid pressure and density are such that flow versus temperature from the pipe channel follows line 25. Assume also that the orifice control channel design is such that operation of the orifice control channel follows line 23. Under these conditions and when the temperature of the control fluid is below the temperature at crossover point 27, the control jet from the orifice will dominate and so the main fluid stream will cling to wall 18 and flow through channel 8 and there will be substantially no flow through channel 9. Thereafter as the temperature of the control fluid increases above the temperature of the crossover point 27, the control jet issuing from the pipe will dominate and the main fluid stream will swing over and attach to wall 19 and flow through channel 9. Thus, at a given predetermined temperature of the control fluid, the main fluid stream can be caused to switch between one of two channels and once it is switched it will remain so by virtue of the wall effect until once again the control jets are unbalanced in a direction which will tend to switch the stream to the opposite wall. This operation may be compared to a bistable electrical circuit which will assume one of two stable operation conditions and will remain in a given operating condition until it is unbalanced by a signal which causes it to switch over to the other operating condition where it again remains in stable operation until a sufficient unbalance of an opposite sort switches it back to the first position.

Referring again to FIGURES 1 and 2, the control channel 15 is preferably substantially similar to a pipe insofar as the effect of fluid viscosity on the velocity of fluid issuing therefrom is concerned. This effect is made more pronounced by including a center body 31 suspended within the channel and defining an annular passage therebetween. The ratio of wetted perimeter of the annular passage to the cross section area of the annular passage is substantially greater than would be obtained for a pipe of the same cross section area. Obviously other types of conduits in which fluid viscosity is even more effective in determining fluid velocity could be employed; however, the structure shown is satisfactory. The orifice control channel 16 on the other hand is of substantially larger diameter so that fluid viscosity has little or no effect on fluid velocity through the channel and includes, for example, a sharp edge orifice 32 at the exit thereof which to restrict the flow without increasing or decreasing, to any noticeable extent, the effect of fluid viscosity on fluid velocity. The purpose of the sharp orifice restriction is to bring the two control jets into balance at the crossover temperature selected. For example, the area of the orifice as well as operating pressure determines the orifice operating curve such as 21, 22 or 23 and so once operating pressure is fixed, the temperature at the crossover point can be selected by a suitable choice of orifice area.

Figure 3:
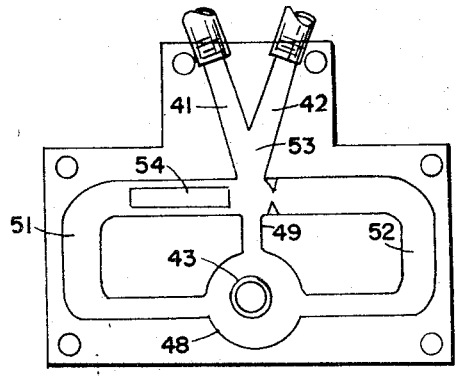
FIGURES 3 and 4 are plan and side views of a fluid switch whereby the main fluid stream is controlled in accordance with its own temperature.
Figure 4:
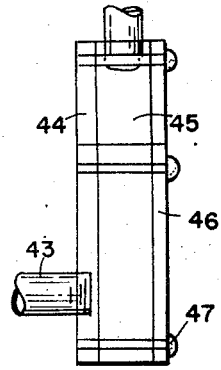

Another embodiment of the invention is illustrated in FIGURES 3 and 4 which show a switch supplied by a single pipe which feeds both the main channel and the control channels. In this embodiment, the main fluid stream is switched to the output channel 41 or channel 42 depending upon the temperature of the main stream. In operation, the fluid from a source is delivered to pipe 43 which threads to outer plate 44 which covers one side of center plate 45, the other side being covered by plate 46. The center plate 45 is cut or grooved to define the channels illustrated in FIGURE 3 and the three plates 44 to 46 are sescurely fastened together to seal these channels by suitable adhesive or bolts or screws such as 47. The fluid is delivered via pipe 43 to the chamber 48 from which it flows through three channels: the main channel 49, pipe control channel 51 and orifice control channel 52. The control channels 51 and 52 direct control jets into the interaction space against the stream from the main channel 49 substantially transverse thereto, the flow from the pipe channel 51 being directed opposite to the flow from the orifice channel 52. The control jet issuing from the pipe channel 51 is substantially affected by the viscosity of the fluid whereas the control jet issuing from the orifice channel 52 is not affected to any extent by the viscosity of the fluid. As a result, the fluid viscosity determines which of the exit channels 41 or 42 the main fluid stream will flow out of, and since viscosity is determined by fluid temperature the main fluid stream is caused to switch between channels 41 and 42 depending upon its own temperature. The acuity or sharpness of switching may be increased by providing the pipe control channel 51 with a center piece 54, thereby to increase the ratio of wetted perimeter to cross section area of this channel for reasons already stated above. The orifice channel 52 is made as large as feasible so that fluid viscosity plays as little part as possible in determining the velocity of the fluid issuing from the orifice.

The fluid switch illustrated in FIGURES 3 and 4 and operating as described above is useful, for example, for controlling the flow of liquid cooling fluid to utilizing equipment such as, for example, airborne electrical systems. In applications where the cooling fluid is continually circulated by a pump through a heat exchanger, to the load, and returned to the pump it is often desirable to bypass the heat exchanger under low temperature operating conditions. For this purpose either of the switches shown in FIGURE 1 or FIGURE 3 may be employed. If, for example, the switch in FIGURE 1 is employed, cooling fluid from the pump is delivered to the pipe 7, and the pipe 12 carries this fluid to the heat exchanger, whereas pipe 11 is connected to a by-pass with an equivalent load. The control fluid feeding pipes 13 and 14 may be tapped just downstream of the load so that when the temperature of this control fluid increases past a predetermined limit, the control jets issuing from the control channels 15 and 16 are such that the main fluid stream issuing from channel 6 is directed along channel 9 to pipe 12 and thence to the heat exchanger. On the other hand when the fluid issuing from the load is below the predetermined temperature, indicating that the load does not require the cooled flow of cooling fluid, the main stream switches to channel 8 and flows to the bypass system.

The embodiment of the switch shown in FIGURE 3 could be employed to accomplish much the same thing, however, the control point would not be the outlet from the load but would be the same as the inlet to the switch. Obviously the embodiment in FIGURE 3 is the simplest, but is less versatile than the embodiment in FIGURE 1.

Figure 6:
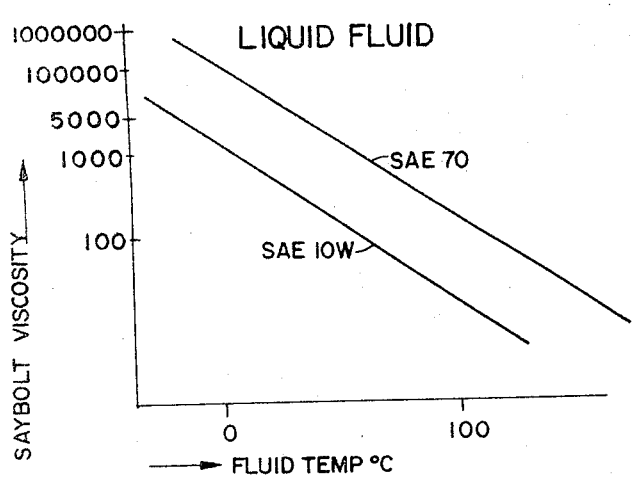
FIGURE 6 is a plot of viscosity versus temperature for a variety of oil fluids.

FIGURE 6 is a plot of viscosity versus temperature for a range of oils and illustrates the substantial changes in viscosity accompanying relatively slight changes in temperature for this type of liquid fluid. The lubricating oils designated would be most suitable for operation upon by such a switching device. For example, it is often desirable to control the flow of lubricating oil to a bearing depending upon the requirements of the bearing as manifested by bearing temperature. This bearing temperature is reflected in the temperature of the lubricating oil, and since the lubricating oil is usually circulated, a fluid switch such as illustrated in FIGURE 1 or 3 would be useful to control the flow of lubricating fluid to the bearing depending upon the requirements of the bearing.

The operating of the fluid switches shown in FIGURES 1 and 3 taken with reference to the operating curves shown in FIGURE 5 relates to fluids for which viscosity decreases as temperature increases and this characteristic is almost universally restricted to liquid fluids and is much more pronounced for some liquid fluids than others. For example, the viscosity changes of water are relatively insignificant compared to the viscosity changes of lubricating oil over a useful temperature range. The viscosity of water changes by a factor of about six from 0° C. to 100° C., whereas the typical lubricating oil viscosity changes by a factor of more than a hundred over the same temperature range.

Figure 7:
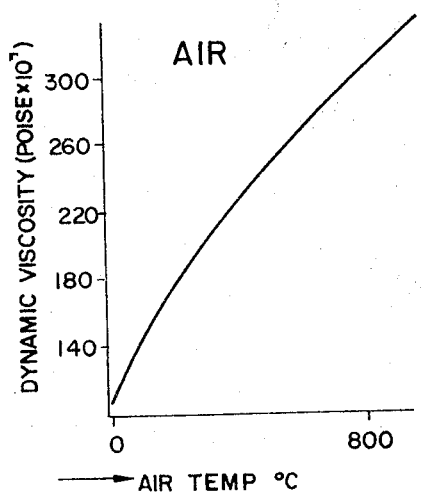
FIGURE 7 is a plot of viscosity versus temperature for a typical gas such as air.

It is well known that the viscosity of most gases varies with temperature in a fashion opposite to most fluids. More particularly, the viscosity of a typical gas increases as temperature increases. FIGURE 7 illustrates the variation of dynamic viscosity of air with the temperature of the air. As can be seen, the viscosity of air varies by approximately a factor of two over a temperature range approaching 800° C. which indicates that a viscosity change of ten to fifteen percent can be expected for a 100° change in temperature of air in the ambient range. This viscosity change, to be sure, is small, however, it is sufficient for actuating a fluid switch incorporating the principles of operations already described. The effect of viscosity on the mass flow rate of a gas at relatively low velocity of flow (in the range of less than .5 Mach number) is much the same as a liquid. Gas flow as Mach numbers below .5 can be described reasonably well employing incompressible flow relations. That is to say, at relatively low velocity, the gas can be considered to be an incompressible fluid just like a liquid. Thus, operating curves similar to those in FIGURE 5 can be formulated for gaseous fluid flow from an orifice control channel and a pipe control channel except that the abscissa (temperature) would be directed oppositely, because the effect of temperature on viscosity is opposite to that of a liquid.

The design of a gas fluid switch operating at high flow velocity approaching Mach 1 or at least greater than Mach .5 would require consideration of the effects of compressibility. At the higher gas flow rate it is advisable to employ a convergent nozzle instead of the sharp edge orifice. Otherwise flow discontinuity can occur around the orifice. In addition the pipe channel should be designed in consideration of compressibility phenomena. The friction factor $f$ of the gas can be determined from the gas viscosity in view of gas temperature; and employing the friction factor and the dimensions of the pipe, the friction parameter $fL/D$, where L is the pipe length and D is the pipe diameter, can be determined. This friction parameter is universally descriptive of fanno flow and is a complex function of the specific heat ratio of the gas and the Mach number of the gas at the exit from the pipe. From this relationship, the Mach number at the exit from the pipe can be determined and from this the gas velocity which determines gas momentum and gas mass flow rate can be determined. Thus, the pipe channel and orifice channel can be designed to provide gas control jets which balance one against the other to switch the main stream of gas flow at a predetermined gas temperature, just as already described above with reference to FIGURES 1, 3 and 5.

This completes specific descriptions of various embodiments of the present invention for providing a device for controlling the flow of a fluid depending on the viscosity (temperature) of a fluid. The controlling fluid may be the same as the controlled fluid and either one or the other may be a liquid or a gas. The controlling action is accomplished by at least one control jet from a control channel so constructed that velocity of flow therefrom is substantially affected by the viscosity of the fluid. This jet impinges upon a main fluid stream directing the course of the main fluid stream. The various embodiments of the invention described provide a two-condition or bi-stable fluid switch, each condition being substantially stable.

What is claimed is:
1. A fluid control device comprising
   means for producing a main fluid stream,
   means including a first passage for producing a first control fluid jet, directed to impinge upon said main stream, said first passage including means for causing the velocity of said jet to vary as a first function of the viscosity of the fluid flowing therethrough, and
   means including a second passage for producting a second control fluid jet, which is also directed to impinge upon said main stream, said second passage including means for causing the velocity of said jet to vary as a second function, different from said first function, of the viscosity of the fluid flowing therethrough.
2. A fluid control device according to claim 1 in which said main fluid stream and said control fluid jets are liquid.
3. A fluid control device according to claim 1 in which said main fluid stream and said control fluid jets are gaseous.
4. A fluid control device according to claim 1 in which said means for producing said first and second jets are relatively located so that said jets impinge on opposite sides of said main stream.
5. A fluid control device according to claim 4 in which said means for producing said first jet is constructed to produce a jet the velocity of which is substantially independent of viscosity while said means for producing said second jet is constructed to produce a jet, the velocity of which varies substantially with viscosity.
6. A fluid control device according to claim 5 in which the fluid is selected and said means for producing said jets are constructed so that the strength of said first jet exceeds that of said second jet within a first portion of the operating range of the device, while the strength of said second jet exceeds that of said first jet within a second portion of said operating range.
7. A fluid control device according to claim 6 in which said means for producing said first jet includes a sharp edge orifice.
8. A fluid control device according to claim 7 in which said means for producing said second jet includes a pipe.
9. A fluid control device according to claim 8 in which said means for producing said jets includes means for deriving fluid for both of said jets from a common source.
10. A fluid control device according to claim 9 in which said means for producing said main stream includes means for deriving fluid therefor from said common source.

References Cited

UNITED STATES PATENTS

| | | | |
|---|---|---|---|
| 3,171,421 | 3/1965 | Joesting | 137—81.5 |
| 3,273,377 | 9/1966 | Testerman et al. | 137—81.5 XR |
| 3,331,378 | 7/1967 | Bowles | 137—81.5 |
| 3,335,737 | 8/1967 | Gesell | 137—81.5 |
| 3,361,149 | 1/1968 | Meyer | 137—81.5 |
| 3,362,422 | 1/1968 | Toma | 137—81.5 |

SAMUEL SCOTT, *Primary Examiner.*

U.S. Cl. X.R.

236—1